UNITED STATES PATENT OFFICE.

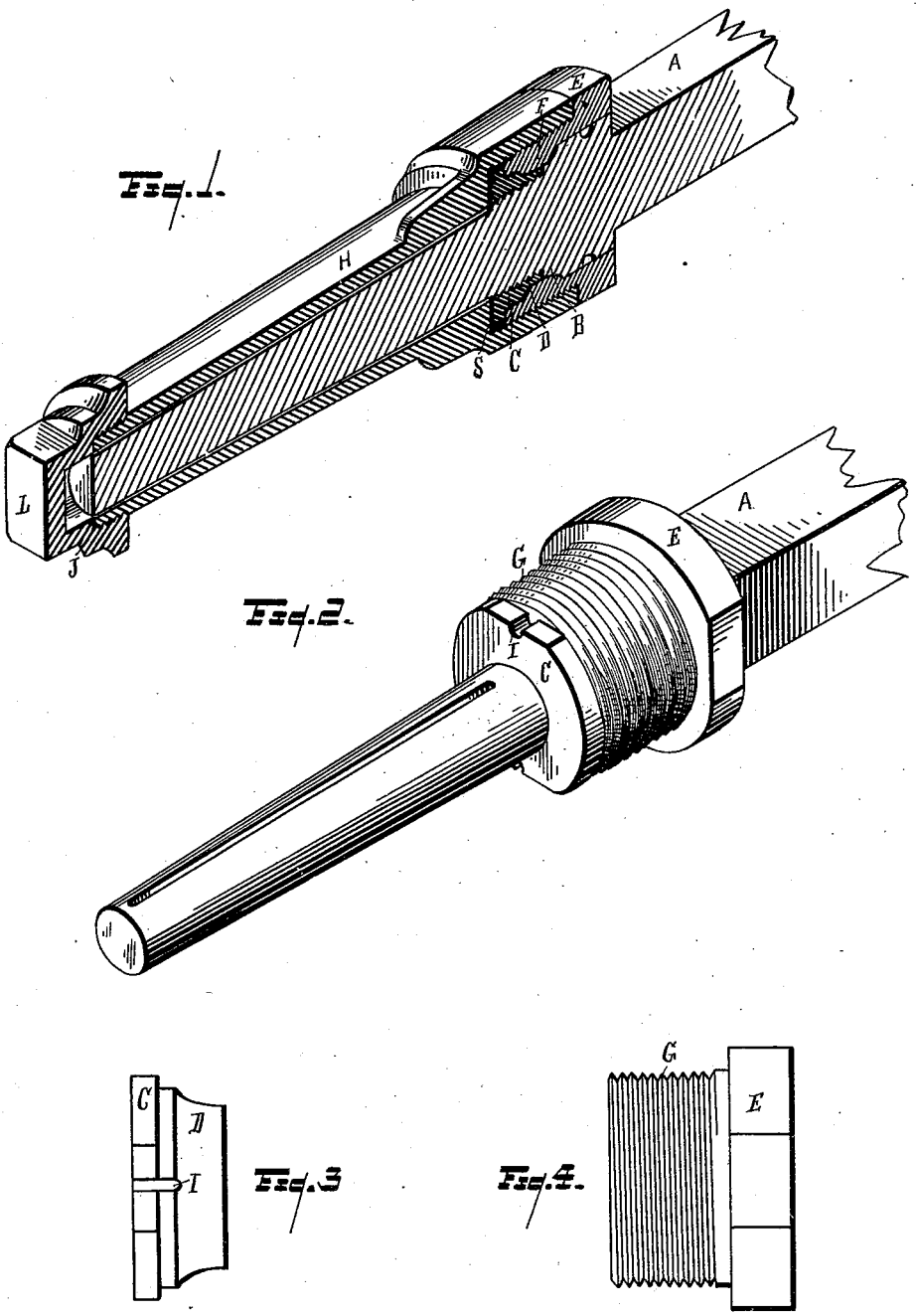

LEVI HARRIS, OF KALAMAZOO, MICHIGAN, ASSIGNOR OF THREE-FOURTHS TO OSCAR M. ALLEN, SR., AND HORACE B. PECK, OF SAME PLACE.

HUB-ATTACHING DEVICE.

SPECIFICATION forming part of Letters Patent No. 512,613, dated January 9, 1894.

Application filed April 11, 1893. Serial No. 469,948. (No model.)

*To all whom it may concern:*

Be it known that I, LEVI HARRIS, a citizen of the United States, residing at Kalamazoo, county of Kalamazoo, and State of Michigan, have invented a new and useful Wheel-Box and Axle, of which the following is a specification.

This invention relates to a wheel box and axle for which United States Letters Patent were granted to me May 1, 1892, No. 476,198, and also to United States Letters Patent granted to me March 21, 1893, No. 493,771, in which Letters Patent the axle was provided with a peripheral groove and the nut at the inner end of the box, which held the wheel on, was provided with an internal circular rib fitting said groove in the axle, said nut being made in two longitudinally separated parts.

The object of the present invention is to make this wheel-box-attaching-nut all in one part, by means of the construction below described and claimed, whereby said nut will not be detached from the axle when the wheel is removed, as was the case in the prior inventions referred to, in which said nut was made in two parts.

In the drawings forming a part of this specification, Figure 1 is a longitudinal section of the axle and box, in perspective; Fig. 2 a perspective view of the axle, with the box removed; and Figs. 3 and 4 are elevations of lettered details below described.

Referring to the lettered parts of the drawings, A is the axle. In the prior patents above referred to, the peripheral groove was entirely formed in the axle itself, while in the present instance a portion of this groove is formed in the axle, as at B, and the other portion is formed in the nut, C, as at D, which nut C is internally screw-threaded and screws on to a threaded portion of the axle, A, immediately forward of that portion, B, of the groove which is formed in said axle, A, so that when the nut C is screwed up to place the entire groove is completed, as in Fig. 1. The nut C, in this position virtually forms, in effect, a portion of the axle, but the importance of this nut rests in the office it performs in this connection, which is to hold the wheel-box-attaching-nut, E, on to the axle, at the inner end, by which means I am enabled to make said nut E all in one part. This nut, E, is provided with an internal circular rib, F, the same as in the two-part nut referred to, to fit in the axle-groove and to be self-adjusting by gravity, as to wear, thus preventing end-shucking, without the use of packing; that is, it matters not how much this rib and groove become worn, they will always center to a close fit on the under side, for a clearer explanation of which, reference may be had to the prior patents referred to.

The forward end of the nut E is exteriorly screw-threaded, at G, and the inner end of the box, H, is internally chambered and screw-threaded and screws on to the threaded portion, G, of the nut E and incloses the nut C when attaching the wheel-box to the axle, as in Fig. 1, in which use the nut E virtually becomes a part of the box H and turns with said box when the wheel revolves on the axle.

To recapitulate: The nut C holds the nut E on the axle, A, and also bears a part of the axle-groove, and the nut E, which is held on by said nut C, holds the box H on the axle.

It should be observed that the nut C cannot accidentally turn off, owing to the shoulder, S, in the box forward of its internal threads.

In removing the wheel, the nut E is held rigid by a wrench and the wheel revolved until the box H is screwed off from said nut E, when the wheel is removed, leaving the nuts E and C still remaining on the axle, A, as in Fig. 2, said nuts only having to be removed at long intervals, when desiring to clean the wearing surfaces, since said surfaces are lubricated by the oil in the box H working through the grooves, I, formed in the edge of the nut C and transversely thereto, leading into the peripheral groove of the axle, Figs. 2 and 3.

The outer ends of the box H and the axle A terminate at the same point, as at J, Fig. 1, the hole in the box coming entirely through said end. This outer end of the box is exteriorly screw-threaded, and the internally screw-threaded nut, L, is screwed on to said box for holding on the hub (not here shown)

and also for closing the end of said box, said nut being chambered out beyond the end of the axle, forming an oil space. By this means the box can be more readily cored out and the nut surrounds that portion of the box which surrounds the outer end of the axle, making a construction simple, strong and compact, and the chamber in the nut forms an oil space.

Having thus described my invention, what I claim as new, and desire to secure by Letters Patent of the United States, is—

1. The combination of an axle provided with a portion of a peripheral circular groove formed therein, and with an exterior threaded portion forward thereof, a nut adapted to screw on to said threaded portion of the axle and provided with the other portion of the peripheral circular groove formed therein, a wheel-box-attaching-nut exteriorly screw-threaded and provided with the internal circular rib, and a wheel-box internally chambered and screw-threaded at the inner end and adapted to screw on to the threaded portion of the nut bearing the internal rib and to inclose the nut which holds the former named nut on the axle; substantially as set forth.

2. The combination of an axle provided with a portion of a peripheral circular groove formed therein, and with an exterior threaded portion forward thereof, a nut adapted to screw on to said threaded portion of the axle and provided with the other portion of the peripheral circular groove formed therein and provided with the oil channels leading into the peripheral groove, a wheel-box-attaching-nut exteriorly screw threaded and provided with the internal circular rib, and a wheel-box internally chambered and screw threaded at the inner end and adapted to screw on to the threaded portion of the nut bearing the internal rib and to inclose the nut which holds the former named nut on the axle; substantially as set forth.

In testimony to the foregoing I have hereunto subscribed my name in the presence of two witnesses.

LEVI HARRIS.

Witnesses:
 LUCIUS C. WEST,
 ELEANOR A. HARRIS.